A. O. BUCKIUS.
PIN AND CLEVIS.
APPLICATION FILED AUG. 11, 1908.

923,767.

Patented June 1, 1909.

WITNESSES
W. W. Swartz
R. A. Balderson

INVENTOR
A. O. Buckius
by Bakewell, Byrnes & Parmelee,
his Atty.

UNITED STATES PATENT OFFICE.

ALBERT O. BUCKIUS, OF CHICAGO, ILLINOIS, ASSIGNOR TO THE NATIONAL MALLEABLE CASTINGS COMPANY, OF CHICAGO, ILLINOIS, A CORPORATION OF OHIO.

PIN AND CLEVIS.

No. 923,767.  Specification of Letters Patent.  Patented June 1, 1909.

Application filed August 11, 1908. Serial No. 447,974.

*To all whom it may concern:*

Be it known that I, ALBERT O. BUCKIUS, of Chicago, Cook county, Illinois, have invented a new and useful Pin and Clevis, of which the following is a full, clear, and exact description, reference being had to the accompanying drawings, forming part of this specification, in which:—

Figure 1:
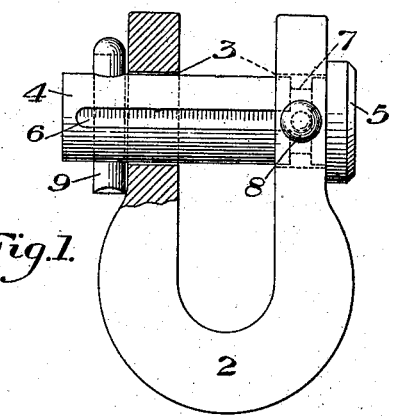
Figure 2:
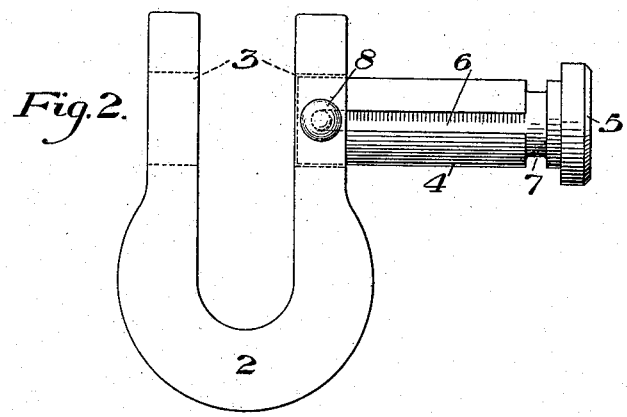
Figure 3:
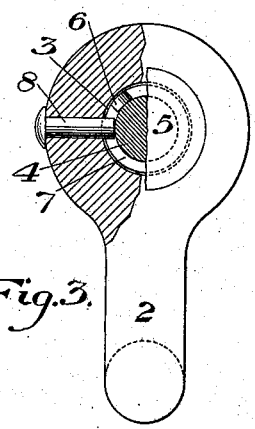

Figure 1 is a side elevation partly in section of a pin and clevis device embodying my invention; Fig. 2 is a similar view showing the cotter detached from the pin and the pin drawn out to the farthest possible extent after the retaining device has been upset; and Fig. 3 is an end elevation partly in section.

My invention has relation to a pin and clevis which has been more particularly designed for use in connection with car couplers, but which can be used for a variety of other purposes.

In the ordinary pin and clevis devices in use, the pins are continually dropping out and becoming lost, which result in the couplers becoming inoperative and the clevises being lost from the chains. My invention is designed to provide a device of this kind, in which the pin is so connected with the clevis as to at all times remain therewith. My device in these respects possesses the advantages of the invention claimed by me in my application No. 405,308, filed on December 6, 1907, upon which it is an improvement.

In the drawings, 2 is the clevis having alined eyes 3 in its arms; 4 is the pin having a head 5 and a longitudinal groove 6 which terminates short of the end of the pin at one end thereof, and at the other end extends into a circumferential groove 7 adjacent to the head 5. When the pin is placed in the eyes of the clevis a holding pin 8 is inserted through a radial hole of one of the eyes and is fixed in the hole. I effect this preferably by using as the holding pin a rivet-shaped pin which fits the radial hole snugly and is forcibly driven into the same until its end is in the groove 6 or 7. The pin can now be turned freely, the end of the rivet passing along the groove 7 or the pin may be drawn outwardly until the end of the groove 6 engages the rivet, but it cannot be withdrawn farther. When in use the pin is confined at its end preferably by a cotter 9 which passes through a hole in the pin, and if this cotter should be lost the pin will be retained on the clevis by the holding pin or rivet as above explained.

Modifications in my invention may be made by those skilled in the art.

I claim:—

1. A clevis having a pin arranged to slide endwise and a fixed holding pin inserted through the eye of the clevis and slidingly engaging the pin to prevent its removal.

2. A clevis having a pin arranged to slide endwise, and having a longitudinal groove closed at the ends, and a fixed holding pin inserted through the eye of the clevis and fitting in the groove.

3. A clevis having a pin arranged to slide endwise, and having a longitudinal groove and a circumferential groove communicating therewith, and a fixed holding pin inserted through the eye of the clevis and fitting in the groove.

In testimony whereof, I have hereunto set my hand.

ALBERT O. BUCKIUS.

Witnesses:
LOUIS J. LAGOIN,
JOSEPH O. OKERBLOOM.